(12) United States Patent
Kim (10) Patent No.: US 11,830,120 B2
(45) Date of Patent: Nov. 28, 2023

(54) SPEECH IMAGE PROVIDING METHOD AND COMPUTING DEVICE FOR PERFORMING THE SAME

(71) Applicant: DEEPBRAIN AI INC., Seoul (KR)

(72) Inventor: Doo Hyun Kim, Gyeonggi-do (KR)

(73) Assignee: DEEPBRAIN AI INC., Seoul (KR)

( * ) Notice: Subject to any disclaimer, the term of this patent is extended or adjusted under 35 U.S.C. 154(b) by 10 days.

(21) Appl. No.: 17/765,094

(22) PCT Filed: Jul. 9, 2021

(86) PCT No.: PCT/KR2021/008828
§ 371 (c)(1),
(2) Date: Mar. 30, 2022

(87) PCT Pub. No.: WO2023/277231
PCT Pub. Date: Jan. 5, 2023

(65) Prior Publication Data
US 2023/0005202 A1 Jan. 5, 2023

(51) Int. Cl.
*G06T 13/20* (2011.01)
*G06T 13/80* (2011.01)
*G10L 21/10* (2013.01)

(52) U.S. Cl.
CPC ............ *G06T 13/205* (2013.01); *G06T 13/80* (2013.01); *G10L 21/10* (2013.01); *G10L 2021/105* (2013.01)

(58) Field of Classification Search
CPC ....... G06T 13/205; G06T 13/80; G06T 13/40; G10L 21/10; G10L 2021/105
See application file for complete search history.

(56) References Cited

U.S. PATENT DOCUMENTS 6,661,418 B1 * 12/2003 McMillan ............. G06T 13/205
704/E21.02
6,919,892 B1 * 7/2005 Cheiky ................... G06T 13/40
348/E5.022

(Continued)

FOREIGN PATENT DOCUMENTS

JP 2019-96114 A 6/2019
KR 10-2000-0009490 A 2/2000

(Continued)

OTHER PUBLICATIONS

Amir Jamaludin et al., "You Said That?: Synthesising Talking Faces from Audio", International Journal of Computer Vision (2019) 127, pp. 1767-1779, https://doi.org/10.1007/s11263-019-01150-y.

(Continued)

*Primary Examiner* — King Y Poon
*Assistant Examiner* — Vincent Peren
(74) *Attorney, Agent, or Firm* — The PL Law Group, PLLC (57) ABSTRACT

A computing device according to an embodiment includes one or more processors, a memory storing one or more programs executed by the one or more processors, a standby state image generating module configured to generate a standby state image in which a person is in a standby state, and generate a back-motion image set including a plurality of back-motion images at a preset frame interval from the standby state image for image interpolation between a preset reference frame of the standby state image, a speech state image generating module configured to generate a speech state image in which a person is in a speech state based on a source of speech content, and an image playback module configured to generate a synthetic speech image by combining the standby state image and the speech state image while playing the standby state image.

10 Claims, 7 Drawing Sheets

(56) References Cited

U.S. PATENT DOCUMENTS

| | | | | |
|---|---|---|---|---|
| 7,136,818 | B1* | 11/2006 | Cosatto | G10L 15/1807 704/E21.02 |
| 7,168,953 | B1* | 1/2007 | Poggio | G06T 13/40 704/E21.02 |
| 7,627,478 | B2* | 12/2009 | Cosatto | G06F 16/9577 345/473 |
| 7,797,146 | B2* | 9/2010 | Harless | G10L 15/26 345/475 |
| 2003/0144055 | A1* | 7/2003 | Guo | G06T 13/40 704/E21.02 |
| 2003/0149569 | A1* | 8/2003 | Jowitt | G06T 13/00 704/E21.02 |
| 2006/0074688 | A1* | 4/2006 | Cosatto | G06T 13/40 704/275 |
| 2009/0044112 | A1* | 2/2009 | Basso | G10L 13/08 715/706 |
| 2013/0065205 | A1* | 3/2013 | Park | G06T 13/40 434/167 |
| 2015/0371661 | A1* | 12/2015 | Chapman | A63F 13/54 704/270 |
| 2019/0057533 | A1* | 2/2019 | Habra | G06T 13/205 |
| 2019/0279410 | A1* | 9/2019 | Orvalho | G06F 3/012 |
| 2019/0340802 | A1* | 11/2019 | Tarawneh | G06T 13/00 |

FOREIGN PATENT DOCUMENTS

| | | | | |
|---|---|---|---|---|
| KR | 10-2008-0019842 | A | 3/2008 | |
| KR | 10-1925440 | B1 | 12/2018 | |
| KR | 10-2020-0145701 | A | 12/2020 | |
| WO | WO 2017/094527 | A1 | 6/2017 | |
| WO | WO-2017094527 | A1 * | 6/2017 | G06F 3/0484 |

OTHER PUBLICATIONS

Iryna Korshunova et al., "Fast Face-Swap Using Convolutional Neural Networks", Proceedings of the IEEE International Conference on Computer Vision (ICCV), 2017, pp. 3677-3685, arXiv:1611.09577.

* cited by examiner

SPEECH IMAGE PROVIDING METHOD AND COMPUTING DEVICE FOR PERFORMING THE SAME

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/008828, filed Jul. 9, 2021, which claims priority to the benefit of Korean Patent Application No. 10-2021-0085515 filed in the Korean Intellectual Property Office on Jun. 30, 2021, the entire contents of which are incorporated herein by reference.

BACKGROUND

1. Technical Field

Embodiments of the present disclosure relate to a technology for providing a speech image.

2. Background Art

With the recent technological development in the field of artificial intelligence, various types of content are being generated based on artificial intelligence (AI) technology. For example, there is a case in which, when there is a voice message to be transmitted, a speech image is generated as if a famous person (e.g., a president) speaks the voice message in order to draw people's attention. This is achieved by generating mouth shapes or the like to fit a specific message, just like a famous person speaking the specific message in an image of the famous person.

In addition, technologies that allow artificial intelligence (AI) to conduct conversations with humans (e.g., video calls, or the like) are being studied. In the technologies, synthesizing the speech image takes time and requires a lot of data, and thus it is difficult to generate an image of a conversation (or an image of speech) in real time, which may be a problem. That is, the artificial intelligence has to recognize the other person's words and decide what kind of answer to give, and it takes time to generate a speech image corresponding to the answer, and thus the artificial intelligence speech image feels unnatural from the other person's point of view.

SUMMARY

Embodiments of the present disclosure is to provide a new technology for providing an artificial intelligence-based speech image in real time.

According to an embodiment, a computing device including one or more processors and a memory storing one or more programs executed by the one or more processors includes: a standby state image generating module configured to generate a standby state image in which a person in the image is in a standby state, and generate a back-motion image set including a plurality of back-motion images at a preset frame interval from the standby state image for image interpolation between a preset reference frame of the standby state image; a speech state image generating module configured to generate a speech state image in which a person is in a speech state based on a source of speech content; and an image playback module configured to generate a synthetic speech image by combining the standby state image and the speech state image while playing the standby state image.

The back-motion image set may include a plurality of back-motion images having different initial speech shapes of the person in the images.

The image playback module may be further configured to extract a back-motion image set based on a point of time when the generating of the speech state image is completed, return a standby state image being played to a preset reference frame based on the back-motion image set, and generate a synthetic speech image in combination with a frame of the speech state image from the reference frame.

The image playback module may be further configured to detect a closest frame having a back-motion image set among frames after a current frame of the standby state image being played, at the point of time when the generating of the speech state image is completed, and extract the back-motion image set of the detected frame.

The image playback module may be further configured to extract a back-motion image having an initial speech shape corresponding to a source of speech content from the back-motion image set, and return the standby state image to the reference frame using the extracted back-motion image as an interpolation image.

The image playback module may be further configured to play the standby state image again from an end point of time of the speech state image when the speech state image is ended during playback of the synthetic speech image.

The speech state image generating module may be further configured to generate each of an audio part and an image part of the speech state image based on the source of speech content, the image part being generated for a face portion of a person in the standby state image.

The image playback module may be further configured to replace the face portion of the standby state image with the image part of the speech state image, and generate the synthetic speech image by combining the standby state image where the face portion is replaced and the audio part of the speech state image.

According to another embodiment, a computing device including one or more processors and a memory storing one or more programs executed by the one or more processors includes: a standby state image generating module configured to generate a standby state image in which a person is in a standby state, and generate a back-motion image set including a plurality of back-motion images at a preset frame interval from the standby state image for image interpolation between a preset reference frame of the standby state image, and an image playback module configured to transmit a source of speech content to a server, receives a speech state image in which a person is in a speech state from the server, and generate a synthetic speech image by combining the standby state image and the speech state image while playing the standby state image.

According to an embodiment, a speech image providing method performed by a computing device including one or more processors and a memory storing one or more programs executed by the one or more processors includes: generating a standby state image in which a person is in a standby state; generating a back-motion image set including a plurality of back-motion images at a preset frame interval from the standby state image for image interpolation between a preset reference frame of the standby state image; generating a speech state image in which a person is in a speech state based on a source of speech content; and generating a synthetic speech image by combining the standby state image and the speech state image while playing the standby state image.

According to another embodiment, a speech image providing method performed by a computing device including one or more processors and a memory storing one or more programs executed by the one or more processors includes: generating a standby state image in which a person is in a standby state; generating a back-motion image set including a plurality of back-motion images at a preset frame interval from the standby state image for image interpolation between a preset reference frame of the standby state image; transmitting a source of the speech content to a server; receiving a speech state image in which a person is in a speech state from the server; and generating a synthetic speech image by combining the standby state image and the speech state image while playing the standby state image.

According to the disclosed embodiments, the standby state image is prepared in advance, and the speech state image is generated during playback of the standby state image and combined with the standby state image, thereby making it possible to generate the synthetic speech image in real time, and accordingly, possible to provide conversation-related services based on artificial intelligence in real time.

In addition, the synthetic speech image is generated by generating the image part for the face portion of the person in the standby state image when generating the speech state image, and replacing the face portion of the standby state image with the image part of the speech state image, thereby making is possible to reduce the amount of data while reducing the time required for generating the synthetic speech image.

In addition, a back-motion image set is prepared at a preset interval in the standby state image, the current frame of the current standby state is connected to the first frame thereof by playing the back-motion image corresponding to the source of speech content in a back-motion image set, and the speech state image is combined with the first frame of the standby state image, thereby making it possible to easily generate a synthetic speech image without considering other variables no matter when the speech state image is generated during playback of the standby state image, and to naturally connect the speech shape of the person in the synthetic speech image.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

In the following description, the terminology "transmission", "communication", "reception" of a signal or information and terminology similar thereto may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same is true for "reception" of the signal or information. In addition, in the present specification, a meaning in which two or more pieces of data or information are "related" indicates that when any one piece of data (or information) is obtained, at least a portion of other data (or information) may be obtained based thereon.

Further, it will be understood that, although the terms first, second, etc. may be used herein to describe various elements, these elements should not be limited by these terms. These terms may be used to distinguish one element from another element. For example, without departing from the scope of the present disclosure, a first element could be termed a second element, and similarly, a second element could be termed a first element.

Figure 1:
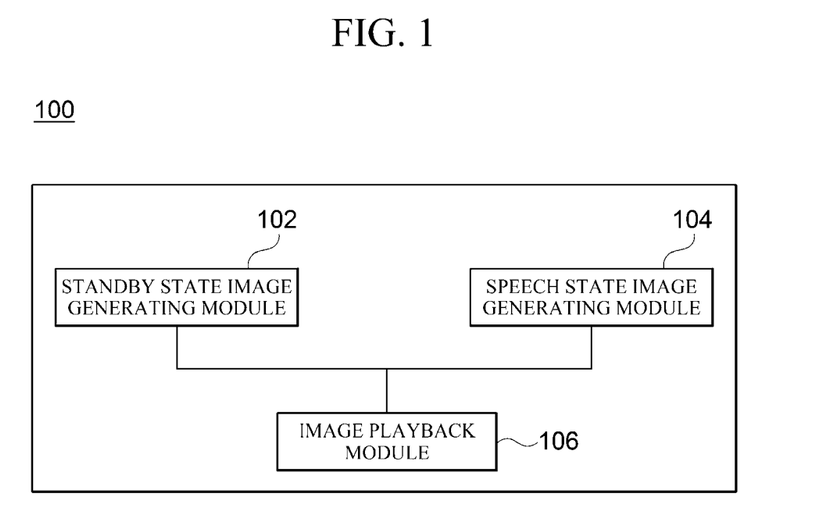
FIG. 1 is a block diagram illustrating a configuration of a speech image providing device according to an embodiment of the present disclosure.

FIG. 1 is a block diagram illustrating a configuration of a speech image providing device according to an embodiment of the present disclosure.

Referring to FIG. 1, the speech image providing device 100 may include a standby state image generating module 102, a speech state image generating module 104, and an image playback module 106.

In an embodiment, the standby state image generating module 102, the speech state image generating module 104, and the image playback module 106 may be implemented by using one or more physically separated devices, or may be implemented by one or more processors or a combination of one or more processors and software, and may not be clearly distinguished in specific operations, unlike the illustrated example.

In an exemplary embodiment, the speech image providing device 100 may be a device for performing a conversation (AI conversation), a video call (AI video call), or the like, using artificial intelligence, but is not limited thereto. The speech image providing device 100 may generate a speech image (e.g., a speech image for a conversation or video call) based on artificial intelligence, and may display the generated speech image on a screen or transmit it to the outside (e.g., a terminal of the conversation partner or a relay server that relays the terminal of the conversation partner and the speech image providing device 100).

For example, the speech image providing device 100 may be installed in a user terminal that wants to have a conversation with artificial intelligence, and may be installed in various devices or facilities such as an unmanned ordering kiosk, an electronic information desk, an outdoor advertising screen, a robot, or the like.

Here, the speech image is a synthesized image based on artificial intelligence, and is an image in which a predetermined person is speaking. Here, the predetermined person may be a fictional person or a person widely known to the public (e.g., entertainer, sports player, president, announcer, or the like), but is not limited thereto.

The standby state image generating module 102 may generate an image in which a person in the image is in a standby state (hereinafter, may be referred to as a standby state image). Here, the standby state may be a state before the person in the image speaks (e.g., a state in which the person is listening to the other party or a state in which there is no speech before there is a conversation, or the like).

The standby state image generating module 102 may generate a standby state image having a preset playback time (e.g., 5 seconds, 30 seconds, or the like). The standby state image may be provided to express a natural motion while the person in the image is in the standby state. That is, the standby state image may be provided to naturally represent the facial expression, posture, and action (e.g., nodding, holding hands and listening, tilting the head, and smiling) of the person in the image while the person is listening to the other party.

The standby state image has a preset playback period and includes a plurality of frames. In addition, each frame of the standby state image may include a changed image in order to express a natural motion while the person in the image is in the standby state. In an exemplary embodiment, the standby state image may be provided to be returned from the last frame to the first frame again and repeatedly played, when being played from the first frame to the last frame.

The standby state image generating module 102 may generate a back-motion image in addition to each frame of the standby state image. The back-motion image may be for image interpolation between an arbitrary frame of the standby state image and a preset reference frame of the standby state image. Hereinafter, it will be described that the reference frame is the first frame of the standby state image as an example. However, the reference frame is not limited thereto.

The standby state image generating module 102 may generate the back-motion image so as to naturally connect an arbitrary frame of the standby state image with the first frame (that is, reference frame) of the standby state image when the standby state image is returned from the arbitrary frame to the first frame.

Figure 2:
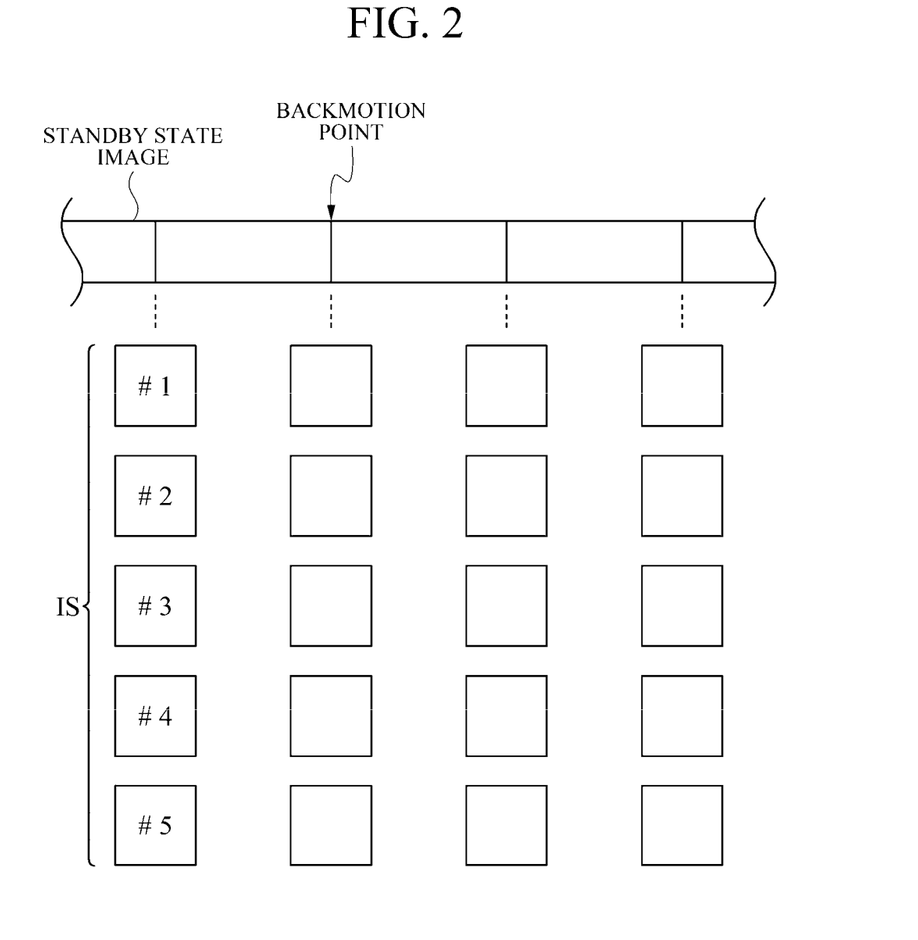
FIG. 2 is a diagram illustrating a state in which a back-motion image is generated in an embodiment of the present disclosure.

FIG. 2 is a diagram illustrating a state in which a back-motion image is generated in an embodiment of the present disclosure. Referring to FIG. 2, the standby state image generating module 102 may generate a back-motion image at every preset time interval (or frame interval) from the standby state image. Hereinafter, a point at which a back-motion image is generated in the standby state image may be referred to as a back-motion point. That is, the standby state image generating module 102 may generate a back-motion image such that a frame corresponding to each back-motion point of the standby state image and a reference frame of the standby state image are naturally connected.

In this case, the standby state image generating module 102 may generate a plurality of back-motion images having different initial speech shapes of the person in the image for each back-motion point. Here, the initial speech shape means the shape of the mouth and the shape around the mouth when the person in the image tries to speak, and may vary depending on the content of the speech that the person in the image intends to speak.

For example, the standby state image generating module 102 may generate, for each back-motion point, a back-motion image set IS including a first back-motion image #1 in which the person in the image has a first initial speech shape, a second back-motion image #2 in which the person in the image has a second initial speech shape, a third back-motion image #3 in which the person in the image has a third initial speech shape, a fourth back-motion image #4 in which the person in the image has a fourth initial speech shape, and a fifth back-motion image #5 in which the person in the image has a fifth initial speech shape. Here, it has been described that there are five initial speech shapes as an example, but the number of initial speech shapes is not limited thereto and the initial speech shapes may be classified into various other numbers.

The speech state image generating module 104 may generate an image in which a person in the image (a person having the same identity as the person in the standby state image) is in a speech state (hereinafter, referred to as a speech state image). Here, the speech state may refer to a state in which the person in the image is speaking (e.g., a state in which the person is speaking to the other party in a conversation, a video call, or the like).

The speech state image generating module 104 may generate a speech state image based on the source of input speech content. The source of speech content may be in the form of text, but is not limited thereto, and may be in the form of a voice.

The source of speech content may be generated through artificial intelligence by the speech image providing device 100 analyzing the speech of the other party, but is not limited thereto, and may be input from an external device (not shown) (e.g., a device that analyzes the speech of the other party and generates the source of speech content) or an administrator. Hereinafter, it will be described that the source of speech content is text as an example.

The speech state image generating module 104 may generate an audio part and an image part for a speech state image based on text of speech content (e.g., "Hello, I am AI tutor Danny"), and generate the speech state image by combining the generated audio part and the image part. The text-based audio and video generation technology is a known technology, and therefore a detailed description thereof will be omitted.

The image playback module 106 may play the standby state image generated by the standby state image module 102. The image playback module 106 may play the standby state image and provide it to the conversation partner. In an exemplary embodiment, the image playback module 106 may play the standby state image and display it on a screen provided in the speech image providing device 100. In this case, the conversation partner may have a conversation with the person in the image while looking at the screen of the speech image providing device 100.

In addition, the image playback module 106 may play the standby state image and transmit it to an external device (e.g., a terminal of the conversation partner or a relay server). In this case, the conversation partner may receive the image through his/her terminal (e.g., smartphone, tablet PC, laptop computer, desktop PC, or the like), or an unmanned ordering kiosk, an electronic information desk, an outdoor advertising screen, or the like to have a conversation with the person in the image.

When the speech state image is generated while the standby state image is being played, the image playback module 106 may generate a synthetic speech image by combining the standby state image and the speech state image, and play the synthetic speech image. The image playback module 106 may provide the synthetic speech image to the conversation partner.

Figure 3:
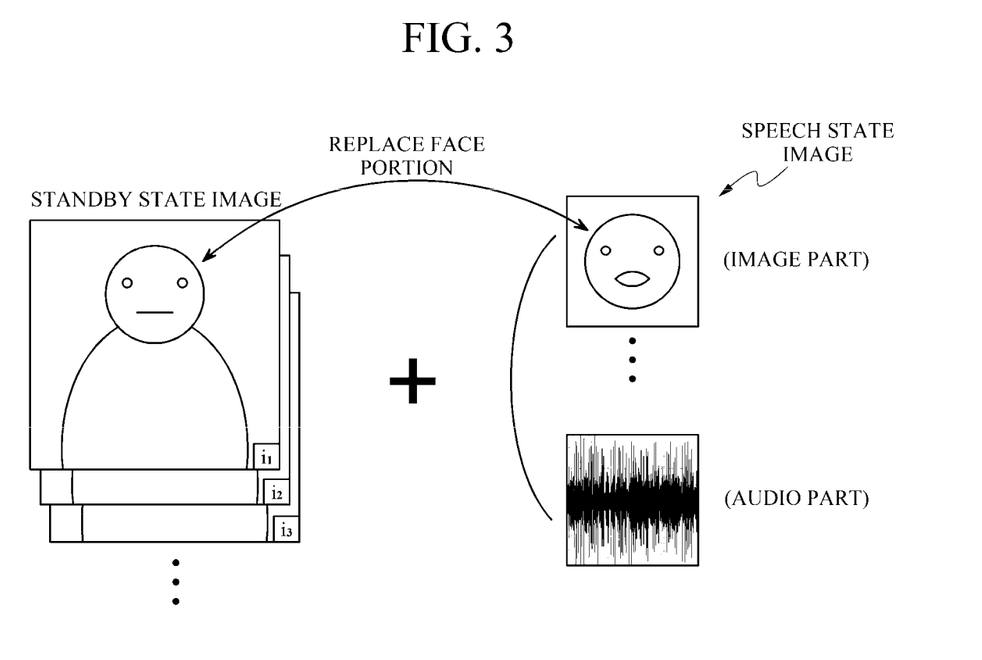
FIG. 3 is a diagram schematically illustrating a state of combining a standby state image and a speech state image in an embodiment of the present disclosure.

FIG. 3 is a diagram schematically illustrating a state of combining a standby state image and a speech state image in an embodiment of the present disclosure. Referring to FIG. 3, the image playback module 106 may generate a synthetic speech image by replacing the face portion of the standby state image with the image part (that is, the face portion of the person) of the speech state image and combining the replaced image and the voice part of the speech state image.

In an exemplary embodiment, when the generation of the speech state image is completed during playback of the standby state image, the image playback module 106 may return the standby state image to the reference frame and generate the synthetic speech image in combination with frames of the speech state image from the preset reference frame of the standby state image. For example, the combination of the standby state image and the speech state image may be performed in a first frame of the standby state image.

In this case, by standardizing a combining point of the standby state image and the speech state image as the reference frame of the standby state image, it is possible to combine the standby state image and the speech state image to easily generate the synthetic speech image, even without considering other factors (e.g., the network environment between the speech image providing device 100 and the terminal of the other party), no matter when the speech state image is generated during playback of the standby state image.

In this case, the image playback module 106 may return the standby state image being played to the first frame (that is, the reference frame) in order to combine the first frame of the standby state image and the speech state image, and then may combine the first frame of the standby state image and the speech state image.

That is, when a source of speech content is input while the image playback module 106 is playing the standby state image, the speech state image generating module 104 may generate the speech state image based on the source of the speech content. When the generation of the speech state image is completed, the image playback module 106 may return the standby state image to the first frame using, as interpolation images, the back-motion image set at the closest point of time (that is, back-motion point) to the point of time when the generation of the speech state image is completed. In this case, the image playback module 106 may extract a back-motion image having an initial speech shape corresponding to the source of speech content, from the back-motion image set.

Figure 4:
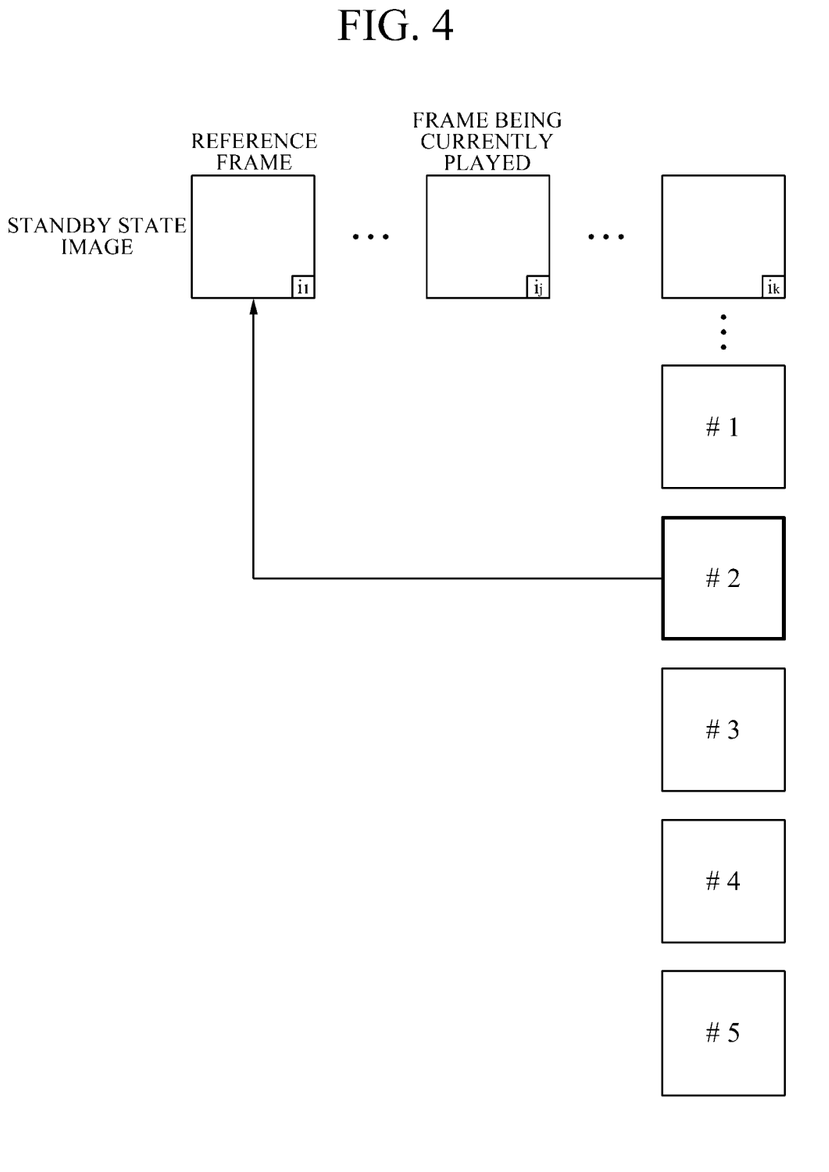
FIG. 4 is a diagram schematically illustrating a state in which an image playback module returns a standby state image being played to the first frame in an embodiment of the present disclosure.

FIG. 4 is a diagram schematically illustrating a state in which the image playback module 106 returns a standby state image being played to the first frame in an embodiment of the present disclosure. Referring to FIG. 4, when the generation of the speech state image is completed in the j-th frame of the standby state image during playback of the standby state image, the image playback module 106 may detect the closest frame having a back-motion image set among frames after the j-th frame of the standby state image which is currently being played.

For example, when the closest frame having a back-motion image set among frames after the j-th frame is the k-th frame, the image playback module 106 may extract a back-motion image set (e.g., the first back-motion image #1 to the fifth back-motion image #5) of the k-th frame. The image playback module 106 may extract a back-motion image (e.g., a second back-motion image #2) having an initial speech shape corresponding to the source of speech content used to generate the speech state image, from the back-motion images set.

The image playback module 106 may return the standby state image to the first frame using the extracted second back-motion image #2 as an interpolation image. That is, the image playback module 106 may play the second back-motion image #2 of the back-motion image set of the k-th frame to naturally return the standby state image to the first frame.

Figure 5:
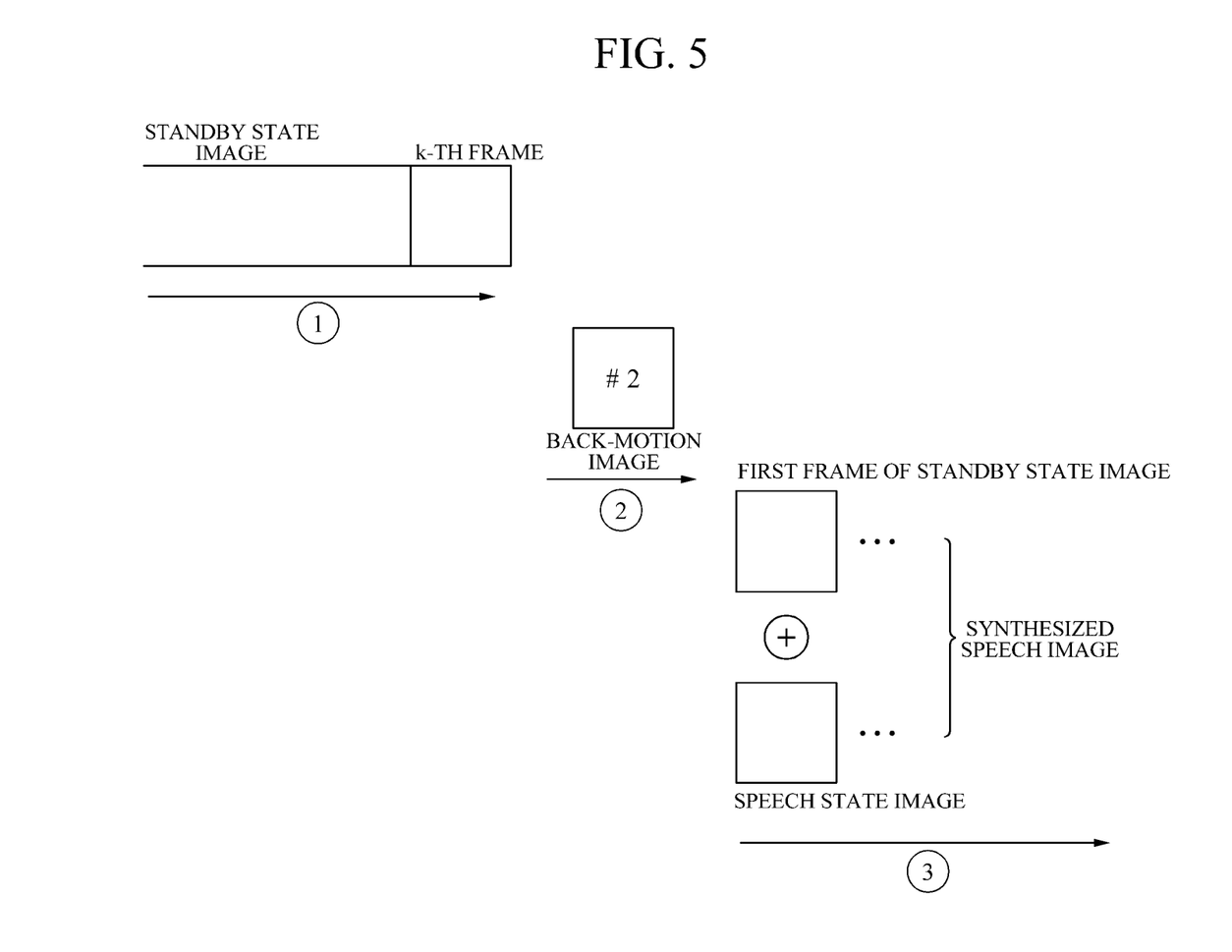
FIG. 5 is a diagram schematically illustrating a process until the image playback module plays a synthetic speech image in an embodiment of the present disclosure.

FIG. 5 is a diagram schematically illustrating a process until the image playback module plays a synthetic speech image in an embodiment of the present disclosure.

Referring to FIG. 5, when the generation of the speech state image is completed while playing the standby state image (①), the image playback module 106 may detect a frame (e.g., the k-th frame) having a back-motion image set closest to the point of time when the generation of the speech state image is completed. The image playback module 106 plays the second back-motion image #2 having an initial speech shape corresponding to the source of speech content in the back-motion image set of the k-th frame (②) to naturally connect the k-th frame of the standby state image and the first frame thereof.

Next, the image playback module 106 may generate and play a synthetic speech image in combination with frames of the speech state image from the first frame of the standby state image (③). The image playback module 106 may generate the synthetic speech image by replacing the face portion of the first frame of the standby state image with the image part of the speech state image. In this case, the second back-motion image having the initial speech shape corresponding to the source of speech content is played as the interpolation image, and then the synthetic speech image is played, and thus the shape of the speech of the person in the synthetic speech image is naturally expressed.

According to the disclosed embodiments, the standby state image is prepared in advance, and the speech state image is generated during playback of the standby state image and combined with the standby state image, thereby making it possible to generate the synthetic speech image in real time, and accordingly, possible to provide conversation-related services based on artificial intelligence in real time.

In addition, the synthetic speech image is generated by generating the image part for the face portion of the person in the standby state image when generating the speech state image, and replacing the face portion of the standby state image with the image part of the speech state image, thereby making is possible to reduce the amount of data while reducing the time required for generating the synthetic speech image.

In addition, a back-motion image set is prepared at a preset interval in the standby state image, the current frame of the current standby state is connected to the first frame thereof by playing the back-motion image corresponding to the source of speech content in a back-motion image set, and the speech state image is combined with the first frame of the standby state image, thereby making it possible to easily generate a synthetic speech image without considering other variables no matter when the speech state image is generated during playback of the standby state image, and to naturally connect the speech shape of the person in the synthetic speech image.

In the present specification, a module may mean a functional and structural combination of hardware for carrying out the technical idea of the present disclosure and software for driving the hardware. For example, the "module" may mean a logical unit of a predetermined code and a hardware resource for executing the predetermined code, and does not necessarily mean physically connected code or a single type of hardware.

Figure 6:
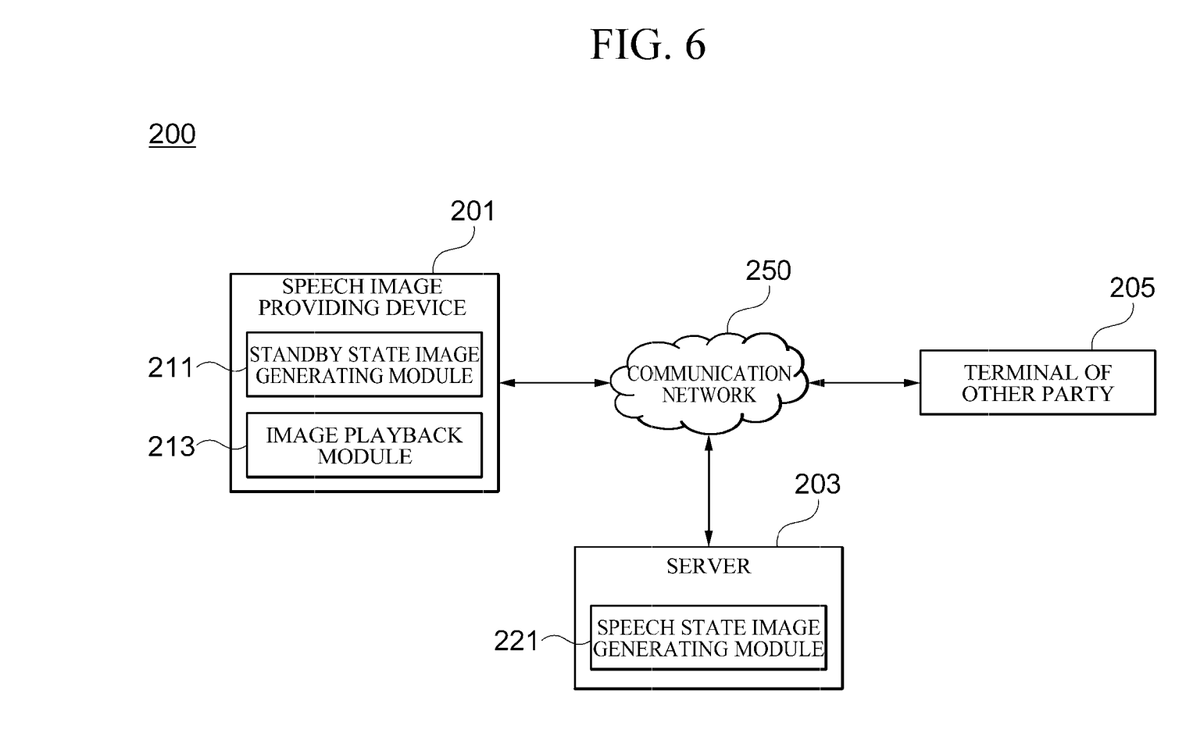
FIG. 6 is a block diagram illustrating a configuration of a speech image providing system according to an embodiment of the present disclosure.

FIG. 6 is a block diagram illustrating a configuration of a speech image providing system according to an embodiment of the present disclosure.

Referring to FIG. 6, a speech image providing system 200 may include a speech image providing device 201, a server 203, and a terminal 205 of the other party. The speech image providing device 201 may be communicatively connected to the server 203 and the terminal 205 of the other part through a communication network 250.

In some embodiments, the communication network 250 may include the Internet, one or more local area networks, wide area networks, cellular networks, mobile networks, other types of networks, or a combination of the above networks.

The speech image providing device 201 may include a standby state image generating module 211 and an image playback module 213. Here, the standby state image generating module 211 is the same as the standby state image generating module 102 shown in FIG. 1, and thus a detailed description thereof will be omitted.

When a source of speech content is input, the image playback module 213 may transmit the source of speech content to the server 203. The server 203 may generate a speech state image based on the source of speech content. That is, the server 203 may include a speech state image generating module 221. In an exemplary embodiment, the server 203 may generate a speech state image (that is, an audio part and an image part) from the source of speech content based on machine learning technology. The server 203 may transmit the generated speech state image to the image playback module 213.

The image playback module 213 may play the standby state image and provide it to the terminal 205 of the other party. When a preset time amount of speech state image is received from the server 203 during playback of the standby state image, the image playback module 213 may generate a synthetic speech image by combining the received speech state image and the standby state image. The image playback module 213 may provide the synthetic speech image to the terminal 205 of the other party.

When a next time amount of speech state image is not received from the server 203, the image playback module 213 may wait until the next time amount of speech state image is received from the server 203 and then generate a synthetic speech image by combining the received speech state image and the standby state image.

Figure 7:
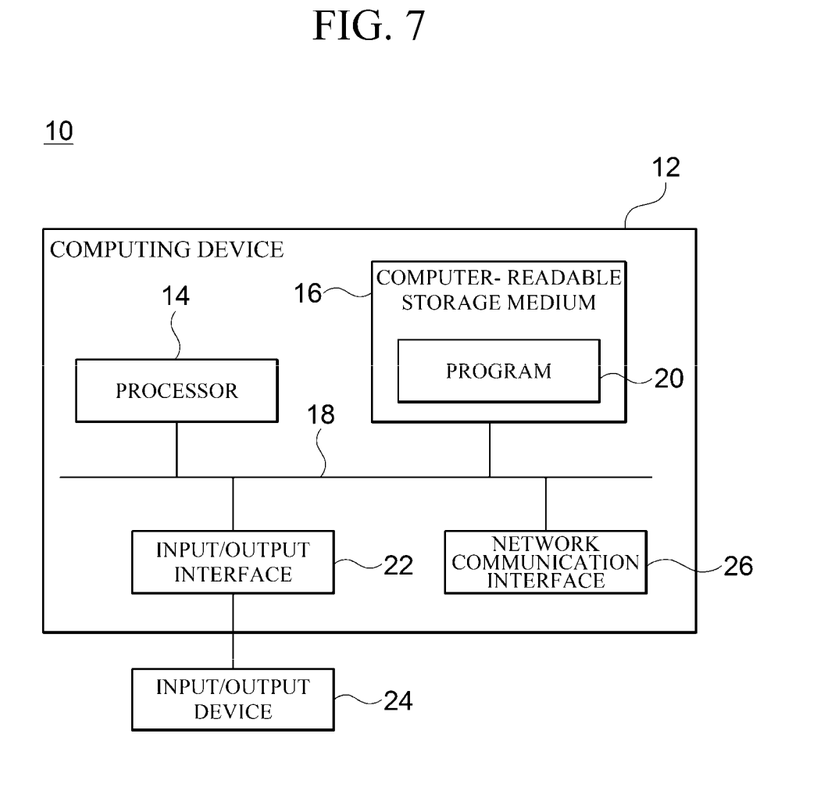
FIG. 7 is a block diagram exemplarily illustrating a computing environment that includes a computing device suitable for use in exemplary embodiments.

FIG. 7 is a block diagram exemplarily illustrating a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the speech image providing device 100.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to the computing device 12 as a separate device distinct from the computing device 12.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A computing device comprising:
   one or more processors;
   a memory storing one or more programs executed by the one or more processors;
   a standby state image generating module configured to generate a standby state image in which a person is in a standby state, and generate a back-motion image set including a plurality of back-motion images at a preset frame interval from the standby state image for image interpolation between a preset reference frame of the standby state image;
   a speech state image generating module configured to generate a speech state image in which a person is in a speech state based on a source of speech content; and
   an image playback module configured to generate a synthetic speech image by combining the standby state image and the speech state image while playing the standby state image,
   wherein the back-motion image set comprises a plurality of back-motion images having different initial speech shapes of the person in the images.

2. The computing device of claim 1, wherein the image playback module is further configured to extract a back-motion image set based on a point of time when the generating of the speech state image is completed, return a standby state image being played to a preset reference frame based on the back-motion image set, and generate a synthetic speech image in combination with a frame of the speech state image from the reference frame.

3. The computing device of claim 2, wherein the image playback module is further configured to detect a closest frame having a back-motion image set among frames after a current frame of the standby state image being played, at the point of time when the generating of the speech state image is completed, and extract the back-motion image set of the detected frame.

4. The computing device of claim 2, wherein the image playback module is further configured to extract a back-motion image having an initial speech shape corresponding to a source of speech content from the back-motion image set, and return the standby state image to the reference frame using the extracted back-motion image as an interpolation image.

5. The computing device of claim 2, wherein the image playback module is further configured to play the standby state image again from an end point of time of the speech state image when the speech state image is ended during playback of the synthetic speech image.

6. The computing device of claim 1, wherein the speech state image generating module is further configured to generate each of an audio part and an image part of the speech state image based on the source of speech content, the image part being generated for a face portion of the person in the standby state image.

7. The computing device of claim 6, wherein the image playback module is further configured to replace the face portion of the standby state image with the image part of the speech state image, and generate the synthetic speech image by combining the standby state image where the face portion is replaced and the audio part of the speech state image.

8. A computing device comprising:
   one or more processors;
   a memory storing one or more programs executed by the one or more processors;
   a standby state image generating module configured to generate a standby state image in which a person is in a standby state, and generate a back-motion image set including a plurality of back-motion images at a preset frame interval from the standby state image for image interpolation between a preset reference frame of the standby state image; and
   an image playback module configured to transmit a source of speech content to a server, receive a speech state image in which a person is in a speech state from the server, and generate a synthetic speech image by combining the standby state image and the speech state image while playing the standby state image,
   wherein the back-motion image set comprises a plurality of back-motion images having different initial speech shapes of the person in the images.

9. A method for providing speech image, the method performed by a computing device including one or more processors and a memory storing one or more programs executed by the one or more processors, the method comprising:
   generating a standby state image in which a person is in a standby state;
   generating a back-motion image set including a plurality of back-motion images at a preset frame interval from the standby state image for image interpolation between a preset reference frame of the standby state image;
   generating a speech state image in which a person is in a speech state based on a source of speech content; and
   generating a synthetic speech image by combining the standby state image and the speech state image while playing the standby state image,
   wherein the back-motion image set comprises a plurality of back-motion images having different initial speech shapes of the person in the images.

10. A method for providing speech image, the method performed by a computing device including one or more processors and a memory storing one or more programs executed by the one or more processors, the method comprising:
    generating a standby state image in which a person is in a standby state;
    generating a back-motion image set including a plurality of back-motion images at a preset frame interval from the standby state image for image interpolation between a preset reference frame of the standby state image;
    transmitting a source of the speech content to a server;
    receiving a speech state image in which a person is in a speech state from the server; and
    generating a synthetic speech image by combining the standby state image and the speech state image while playing the standby state image,
    wherein the back-motion image set comprises a plurality of back-motion images having different initial speech shapes of the person in the images.

* * * * *